United States Patent
Schmid

[19]

[11] Patent Number: 5,875,980
[45] Date of Patent: Mar. 2, 1999

[54] TRAVELING ROCK CRUSHER

[75] Inventor: Josef Schmid, Hollenstein/Ybbs, Austria

[73] Assignee: Schmid & Schneiber Planungs- Und Vertriebs-Ges.mbH, Hollenstein/Ybbs, Austria

[21] Appl. No.: 49,866

[22] Filed: Mar. 27, 1998

[30]   Foreign Application Priority Data

Apr. 2, 1997 [AT] Austria ............................. GM 195/97

[51] Int. Cl.⁶ .................................................. B02C 21/02
[52] U.S. Cl. ............................... 241/101.742; 241/189.1; 241/287
[58] Field of Search ...................... 241/101.72, 101.742, 241/189.1, 287

[56]        References Cited

U.S. PATENT DOCUMENTS

| | | | |
|---|---|---|---|
| 2,197,549 | 4/1940 | Hargrave et al | 241/101.742 |
| 3,662,962 | 5/1972 | Cobey | 241/101.742 |
| 4,417,627 | 11/1983 | Willibald | 241/101.7 X |
| 5,259,692 | 11/1993 | Beller et al. | 241/101.72 X |
| 5,355,918 | 10/1994 | Lang | 241/101.7 X |

FOREIGN PATENT DOCUMENTS 400 452   5/1995   Austria .

*Primary Examiner*—John M. Husar
*Attorney, Agent, or Firm*—Herbert Dubno; Andrew Wilford

[57]          ABSTRACT

A traveling rock crusher has a vehicle body adapted to travel along the ground in a horizontal travel direction, a drum mounted at a front end of the body and rotatable about a horizontal axis generally perpendicular to the direction, an array of radially outwardly projecting chisels mounted on the drum, and a plurality of angularly spaced breaker elements mounted on the drum between the chisels. A support is mounted on the body spaced back in the direction from a rear side of the drum and carries a plurality of vertically spaced breaker bars spaced from the drum. A drive is provided for forcibly rotating the drum about the axis in a sense with a front side of the drum moving upward and the rear portion of the drum moving downward for engaging the chisels and elements with rocks on the ground, picking up the rocks, and comminuting the rocks against the breaker bars.

7 Claims, 2 Drawing Sheets

TRAVELING ROCK CRUSHER

FIELD OF THE INVENTION

The present invention relates to a traveling rock crusher. More particularly this invention concerns a machine that travels along the ground while picking up and crushing rocks ahead of itself to produce a travellable path.

BACKGROUND OF THE INVENTION

A piece of equipment is known for scarifying roadways, clearing paths in a forest, or preparing ground for agricultural use which comprises a vehicle body adapted to travel along the ground in a horizontal travel direction, a drum mounted at a front end of the body and rotatable about a horizontal axis generally perpendicular to the direction, an array of radially outwardly projecting chisels mounted on the drum, and a plurality of angularly spaced breaker elements mounted on the drum between the chisels. As described in Austrian patent document 400,452 a breaker bar is mounted on the body spaced from the drum. When the drum is rotated such that its front side moves upward and its rear side moves downward the chisels and elements engage rocks on the ground, pick them up, and comminute them by crushing them against the breaker bar.

When used for clearing paths in, for example, a forest, this machine does not work well, as opposed to when used to scarify a concrete or macadam roadway. In nature the rocks that need to be cut back or crushed are of varying sizes, so the one-size-fits-all construction of the standard traveling crusher is often ineffective. When, for instance, a large rock is pulled by the chisels out of the ground, it can get wedged between the drum and the breaker bar unless same is set back relatively far, in which case smaller stones will pass through without being comminuted.

OBJECTS OF THE INVENTION

It is therefore an object of the present invention to provide an improved traveling rock crusher.

Another object is the provision of such an improved traveling rock crusher which overcomes the above-given disadvantages, that is which can be used for making roadways in the wild or clearing land for agricultural use.

SUMMARY OF THE INVENTION

A traveling rock crusher has a vehicle body adapted to travel along the ground in a horizontal travel direction, a drum mounted at a front end of the body and rotatable about a horizontal axis generally perpendicular to the direction, an array of radially outwardly projecting chisels mounted on the drum, and a plurality of angularly spaced breaker elements mounted on the drum between the chisels. According to the invention a support is mounted on the body spaced back in the direction from a rear side of the drum and carries a plurality of vertically spaced breaker bars spaced from the drum. A drive is provided for forcibly rotating the drum about the axis in a rotational sense with a front side of the drum moving upward and the rear portion of the drum moving downward for engaging the chisels and elements with rocks on the ground, picking up the rocks, and comminuting the rocks against the breaker bars.

According to the invention each of the breaker bars defines with the drum a respective breaking space. In addition the support carries all the breaker bars and is pivotal on the vehicle body about an axis generally parallel to the drum axis. The crusher further has according to the invention means for pivoting the support about its axis toward and away from the drum. This pivot means includes at least one hydraulic ram.

Thus with this system it is possible to adjust the positions of the breaker bars according to application. In addition the bars can be set so that the uppermost bars are farther from the orbit of the chisels and breaker elements than the lower breaker bars, making it possible to comminute large as well as small rocks. The operator of the machine, whose drum normally rotates at a fairly rapid rate of about 600 RPM, can in fact adjust the position of the support and breaker bars carried by it according to what is directly in front of the relatively slowly moving machine.

The breaker bars in accordance with the invention are horizontal. In addition the chisels form an orbit on rotation off the drum and the bars are more closely spaced to the orbit at a lower region of the support than at an upper region thereof.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
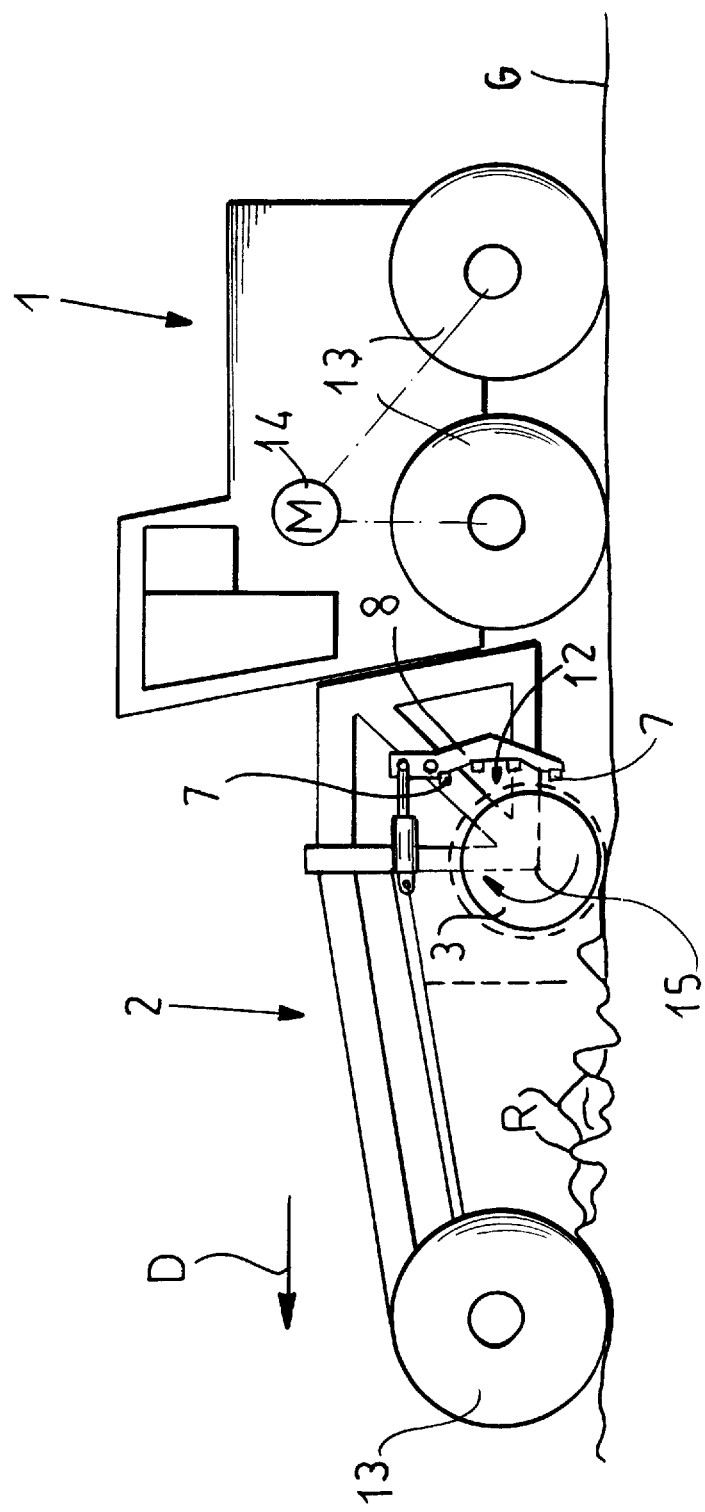
FIG. 1 is a small-scale side view of the traveling rock crusher according to the invention.
Figure 2:
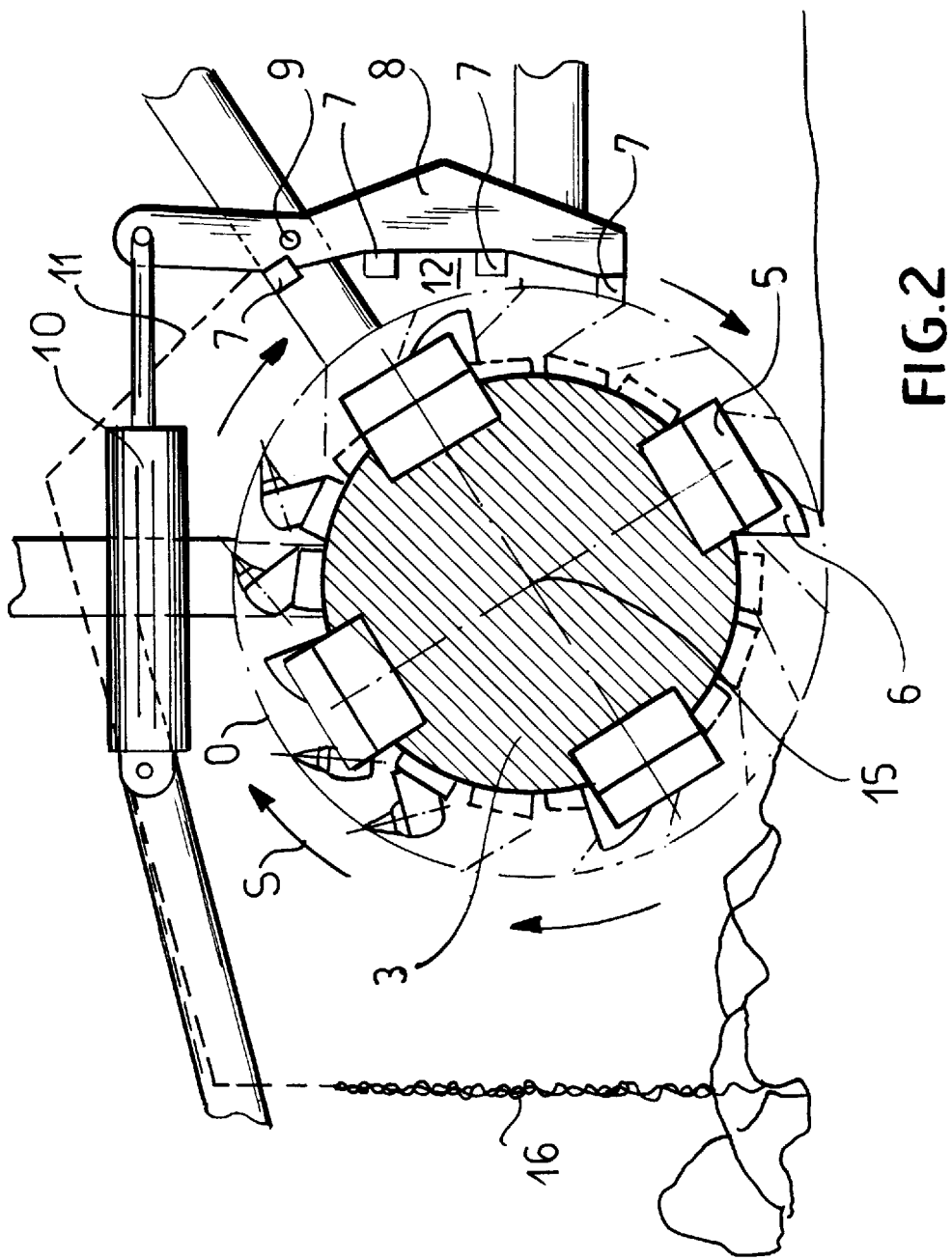
FIG. 2 is a larger-scale vertical section through the crusher part of the apparatus of FIG. 1.

As seen in FIG. 1 a vehicle 1 normally travels via wheels 13 on the ground G in a horizontal normal travel direction D. At its front end the vehicle 1 carries a rock crusher 2 having a large cylindrical drum 3 rotated about an axis 15 by a motor or engine illustrated schematically 14 in a rotational sense S so that the front side of the drum 3 moves upward and its rear side moves downward.

The drum 3 carries a plurality of chisels 4 having rotatable hardened tips that are directed back in the direction S to define an orbit O as the drum 3 rotates. Spaced between and offset from the chisels 4 are breaker elements 5 having hardened metal tips 6. The vehicle 1 has a wall 11 spaced upward and around the drum 3 and a chain curtain 16 is suspended ahead of the drum 3.

According to the invention a support frame 8 is pivoted at 9 about an axis parallel to the axis 15 on the vehicle 1 and carries four vertically spaced square-section metal breaker bars 7 whose faces turned toward the axis 15 are tangent to an imaginary cylinder having a radius of curvature substantially greater than that of the orbit O. The uppermost bar 7 is slightly above the pivot 9 and the other three bars 7 are generally equispaced from each other below it. The upper end of this frame 8 above the pivot 9 is connected to a piston rod of a powerful hydraulic ram 10 whose cylinder is pivoted on the vehicle 1 to pivot this frame 8 about the pivot axis 9 and thereby change the spacing between the bars 7 and the orbit O. Normally the frame 8 is set as shown such that the bars 7 are increasingly closer to the orbit O going downward, that is with the lowermost bar 7 virtually lying on the orbit O and the uppermost bar 7 spaced well therefrom. Each bar 7 defines a crushing space or chamber 12 with the orbit O.

In use as the vehicle 1 travels along the ground with the drum 3 rotating, rocks R are picked up or their upwardly protruding ends are milled off by the chisels 4 and breaker elements 5, 6. The pieces picked up are projected up and back and thrown against the breaker bars 7 and broken in the crushing chamber 12 into smaller pieces, virtually into gravel, and redeposited on the roadbed.

I claim:

1. A traveling rock crusher comprising:
   a vehicle body adapted to travel along the ground in a horizontal travel direction;
   a drum mounted at a front end of the body, having relative to the direction horizontally oppositely directed front and back sides, and rotatable in a rotational sense about a horizontal axis generally perpendicular to the direction;
   an array of radially outwardly projecting chisels mounted on the drum;
   a plurality of angularly spaced breaker elements mounted on the drum between the chisels;
   a support mounted on the body spaced back in the direction only from the rear side of the drum;
   a plurality of vertically spaced breaker bars mounted on the support spaced from the drum; and
   means for forcibly rotating the drum about the axis in the rotational sense with a front side of the drum moving upward and the rear side of the drum moving downward for engaging the chisels and elements with rocks on the ground, picking up the rocks, and comminuting the rocks against the breaker bars.

2. The traveling rock crusher defined in claim 1 wherein each of the breaker bars defines with the drum a respective breaking space.

3. The traveling rock crusher defined in claim 1 wherein the breaker bars are horizontal.

4. The traveling rock crusher defined in claim 1 wherein the chisels form an orbit on rotation off the drum, the bars being more closely spaced to the orbit at a lower region of the support than at an upper region thereof.

5. The traveling rock crusher defined in claim 1, further comprising
   a curtain suspended from the body ahead of the drum and defining with the front side of the drum an empty space.

6. A traveling rock crusher comprising:
   a vehicle body adapted to travel along the ground in a horizontal travel direction;
   a drum mounted at a front end of the body, having relative to the direction horizontally oppositely directed front and back sides, and rotatable in a rotational sense about a horizontal axis generally perpendicular to the direction;
   an array of radially outwardly projecting chisels mounted on the drum;
   a plurality of angularly spaced breaker elements mounted on the drum between the chisels;
   a support mounted on the body spaced back in the direction only from the rear side of the drum, carrying all the breaker bars, and pivotal on the vehicle body about an axis generally parallel to the drum axis;
   a plurality of vertically spaced breaker bars mounted on the support spaced from the drum; and
   means for forcibly rotating the drum about the axis in the rotational sense with a front side of the drum moving upward and the rear side of the drum moving downward for engaging the chisels and elements with rocks on the ground, picking up the rocks, and comminuting the rocks against the breaker bars; and
   means for pivoting the support about its axis toward and away from the drum.

7. The traveling rock crusher defined in claim 6 wherein the pivoting means includes at least one hydraulic ram.

* * * * *